(12) United States Patent
Duneau

(10) Patent No.: US 9,285,948 B2
(45) Date of Patent: Mar. 15, 2016

(54) SYSTEM AND METHOD FOR INTERFACE DISPLAY SCREEN MANIPULATION

(71) Applicant: Eric Duneau, Surbiton (GB)

(72) Inventor: Eric Duneau, Surbiton (GB)

(73) Assignee: ASSIMA SWITZERLAND SA, Lausanne (CH)

( * ) Notice: Subject to any disclaimer, the term of this patent is extended or adjusted under 35 U.S.C. 154(b) by 370 days.

(21) Appl. No.: 13/834,459

(22) Filed: Mar. 15, 2013

(65) Prior Publication Data

US 2014/0282125 A1    Sep. 18, 2014

(51) Int. Cl.
*G06F 3/0481* (2013.01)
*G06F 3/0484* (2013.01)
*G06F 17/24* (2006.01)
*G06F 17/22* (2006.01)

(52) U.S. Cl.
CPC .......... *G06F 3/0481* (2013.01); *G06F 3/04842* (2013.01); *G06F 17/2247* (2013.01); *G06F 17/243* (2013.01); *G06F 17/248* (2013.01)

(58) Field of Classification Search
CPC .................................................... G06F 3/0481
USPC ......................................................... 715/762
See application file for complete search history.

(56) References Cited

U.S. PATENT DOCUMENTS

| | | | | |
|---|---|---|---|---|
| 5,258,855 A * | 11/1993 | Lech | ................... | G06K 9/2054 358/448 |
| 6,968,538 B2 * | 11/2005 | Rust | .......................... | G06F 8/24 715/762 |
| 7,519,987 B1 * | 4/2009 | Holt | ........................ | G06F 21/31 707/999.003 |
| 7,707,550 B2 * | 4/2010 | Resnick | ................. | G05B 15/02 700/169 |
| 7,721,195 B2 * | 5/2010 | Jiang | ........................ | G06F 8/51 455/552.1 |
| 7,849,412 B2 * | 12/2010 | French | ..................... | G06F 8/38 715/762 |
| 8,032,822 B1 * | 10/2011 | Artamonov | .......... | G06Q 20/207 704/9 |
| 8,527,889 B2 * | 9/2013 | Pelley | .................. | G06Q 10/063 715/751 |
| 8,782,530 B2 * | 7/2014 | Beringer | ............... | G06F 9/4443 715/744 |
| 8,972,873 B2 * | 3/2015 | Gerken, III | ............... | G06F 8/38 715/747 |
| 9,123,093 B1 * | 9/2015 | Schumacher | ......... | G06T 7/0004 |
| 2001/0052910 A1 * | 12/2001 | Parekh | .................. | G06F 17/211 715/744 |
| 2003/0025732 A1 * | 2/2003 | Prichard | ................... | G06F 8/38 715/765 |
| 2003/0189585 A1 * | 10/2003 | Forkner | ............ | G06F 17/30899 715/700 |
| 2003/0236576 A1 * | 12/2003 | Resnick | ................. | G05B 15/02 700/9 |
| 2004/0133647 A1 * | 7/2004 | Ozkan | ................... | G06F 3/0481 709/206 |

(Continued)

OTHER PUBLICATIONS

Charikar, M., "Similarity Estimation Techniques from Rounding Algorithms", May 21, 2002, Princeton University.*

*Primary Examiner* — Tadeese Hailu
*Assistant Examiner* — Alvaro R Calderon, IV
(74) *Attorney, Agent, or Firm* — Kenyon & Kenyon LLP

(57) ABSTRACT

A system and method for generation, modification, or manipulation of user interface display screens includes a processor storing display screen templates and instantiation data structures which reference the templates for instantiation of the respective ones of the display screen templates for a plurality of different display screens, where the templates can correspond to respective sub-screens of one or more display screens. The processor can analyze captured display screen data to determine whether the data corresponds to a previously stored one of the templates, and, responsive to a positive result of the determination, store a new instantiation data structure referencing the template to which the data is determined to correspond and otherwise generate a new template to be referenced by the instantiation data structure. Modifications and object associations to a plurality of different display screens can be effected by modification of, or association with, a single one of the templates.

34 Claims, 7 Drawing Sheets

(56) References Cited

U.S. PATENT DOCUMENTS

| | | | |
|---|---|---|---|
| 2004/0153992 A1* | 8/2004 | Molina-Moreno | G06F 8/35 717/105 |
| 2004/0177319 A1* | 9/2004 | Horn | G06F 17/3002 715/205 |
| 2005/0071394 A1* | 3/2005 | Martyn | G06T 19/00 |
| 2005/0097460 A1* | 5/2005 | Oh | G06T 1/60 715/251 |
| 2005/0216887 A1* | 9/2005 | Robertson | G06F 17/248 717/113 |
| 2006/0036739 A1* | 2/2006 | Hagale | H04L 12/581 709/227 |
| 2006/0123344 A1* | 6/2006 | Volkov | G06F 9/4443 715/730 |
| 2007/0150500 A1* | 6/2007 | Kawada | G06Q 10/10 |
| 2007/0261035 A1* | 11/2007 | Duneau | G06F 11/3688 717/135 |
| 2008/0092067 A1* | 4/2008 | Anderson | G06F 9/4443 715/762 |
| 2008/0104501 A1* | 5/2008 | Sattler | G06F 17/248 715/224 |
| 2008/0162539 A1* | 7/2008 | Walter | G06F 9/4443 |
| 2008/0288877 A1* | 11/2008 | Latzina | G06F 9/4443 715/762 |
| 2010/0157384 A1* | 6/2010 | Wu | H04N 1/00222 358/474 |
| 2010/0205529 A1 | 8/2010 | Butin et al. | |
| 2010/0205530 A1 | 8/2010 | Butin et al. | |
| 2010/0251133 A1* | 9/2010 | Beringer | G06F 9/4443 715/744 |
| 2011/0034158 A1* | 2/2011 | Bradley | G06Q 10/10 455/418 |
| 2011/0047462 A1 | 2/2011 | Butin et al. | |
| 2011/0047514 A1 | 2/2011 | Butin et al. | |
| 2011/0099499 A1* | 4/2011 | Pnueli | G06F 8/38 715/771 |
| 2011/0283261 A1* | 11/2011 | Yun | G06F 11/3684 717/124 |
| 2012/0137227 A1* | 5/2012 | Gerken, III | G06F 8/38 715/747 |

\* cited by examiner

SYSTEM AND METHOD FOR INTERFACE DISPLAY SCREEN MANIPULATION

FIELD OF THE INVENTION

The present invention relates to a system and method for software prototyping, software tutorial development, and/or development and/or reproduction of electronic performance support system (EPSS) objects.

BACKGROUND

Development of computer software, especially complex software, requires collaboration of designers and programmers. Once a program version is developed, further modification of the program is often required. In particular, modification of a generic software application is often required to tailor the program to the needs of a particular entity. Where software, such as Enterprise Resource Planning (ERP) software, is developed for large entities, a number of groups, each including a large number of people, and assigned different tasks often collaborates to create the software. For example, the designers may include a business model design team, software design team, and programmers. The business model design team creates business model designs, for which the software designers create software specifications for modeling a software process satisfying the identified business needs, which software specifications the programmers use to code programs satisfying the software specifications. Further, different sub-groups may be assigned to different aspects of business model and software specification development, which are then to be consolidated to create the software specifications to be passed on to the programmers who program the software according to the specifications. The programmers, too, may be assigned to the coding of different software parts to be used in concert.

The specifications for software development are therefore often disorganized. Additionally, the specifications are often based on the software designers' mental conceptualizations of the software modifications. Actual modifications may therefore be different than expected by the software designers, requiring another iteration of specifications development and software modification.

Additionally, the software coding for implementation of the specification often falls short of the specifications provided to the programmers. Testing is therefore required to ensure that the programmed software application matches the specifications. This includes a potentially lengthy task of manual testing by domain experts to ensure that the programmed software complies with the expected application behavior as defined by the specifications.

The procedure is prone to error, with respect to the software designers' understanding of the business model designers' requirements, the software designers' conceptualization of the application behavior according to their specifications, the programmers' understanding of the expected application behavior as set forth in the specifications, and the testing of the coded software.

The software development procedure may therefore require numerous iterations and cost an enormous amount, with respect to both time and money.

Furthermore, for implementation of software, users are trained in their use. Such training often requires simulations of an actual use of the software. However, a simulation may become outdated in view of software modifications implemented subsequent to creation of the simulation. Modifications of the simulation are therefore required, which modifications require determination of how the modifications affect the simulation, or to create an entirely new software simulation. Additionally, captured screenshots often include data having been input in the target application whose display screens have been captured, which data may be private. There may therefore be a desire to change out data displayed in fields for the training display screens, which would require entering such a change to the captured display screens including private data. Moreover, while captured data text or user interface type text is in one language, there may be a desire to store versions of training display screens in other languages, requiring the modification of the display screens to create respective versions thereof in other languages.

U.S. patent application Ser. No. 11/430,482, filed May 8, 2006, which issued as U.S. Pat. No. 8,087,007 ("the '007 patent"), and which is incorporated by reference herein in its entirety, describes a system and method for increasing efficiency of software and training simulation development and modification.

Aside from a core program, software administrators and/or user with sufficient permission can create EPSS objects, which can include user help tips, warnings, and/or program behavior modifications, which objects can be respectively associated with various parts of an application, including, for example, graphical parts, such as graphical user interface (GUI) controls.

SUMMARY

However, often a user interface program is programmed to output a multitude of different graphical user interface display screens at various points of program execution. Modification of the program or simulation thereof therefore requires separately revising each of the screens of the program or simulation, which can be extremely tedious and time-consuming, particularly for elaborate programs including potentially thousands of display screens. Similarly, provision of EPSS objects in association with display screens requires generation of a multitude of EPSS objects for the different screens, which, likewise, can be extremely tedious and time-consuming. Further, an EPSS object that had been associated with a GUI control of a display screen may lose its associations with the display screen and control (context) if a change made in such display screen includes a change to the context as detected with respect to the screen prior to the change.

Accordingly, embodiments of the present invention provide a system and method that increases efficiency of development and modification of program display screens, simulations of programs including display screens, and/or EPSS objects associated with program display screens.

According to example embodiments of the present invention, for each of a plurality of groups of a respective plurality of similar display screens, a system and method store, manipulate, and/or interpret the respective plurality of similar display screens of the group as a combination of a single display screen template and a plurality of instances of the display screen template.

According to example embodiments of the present invention, for each of those of the plurality of similar display screens of the group that are not exact replicas of the display screen template, the system and method further maintains a respective modification script to be executed by a processor of the system on a respective instance of the display screen template, according to which execution, the processor modifies the instance to include the required variation(s) by which the display screen differs from the display screen template.

Such variations can include user interface variations and/or data variations, e.g., adding data text to a field.

According to example embodiments of the present invention, the system and method store, manipulate, and/or interpret a display screen as a set of display screen elements. According to an example embodiment, the screen elements include a plurality of sub-screens. According to an example embodiment, the system and method perform operations at the sub-screen level. According to an example embodiment, the system and method store and manipulate the screen elements according to the described screen template and instance paradigm. For example, in an example embodiment, the system and method store a first display screen as a first collection of pointers to sub-screen templates (and/or modification scripts, e.g., in an instance where changes to the template, e.g., with respect to user interface and/or text objects, are to be made to recreate the target display screen) and store a second display screen as a second collection of pointers to sub-screen templates (and/or modification scripts). The sub-screen templates (and/or modification scripts) to which the first and second collections point can all be the same or different, or can include some which are the same for the two collections and some which differ between the two collections.

According to an example embodiment of the present invention, the system and method store and/or manipulate the screen elements according to a hierarchy. For example, according to an example embodiment, the system and method relate a parent screen template or sub-screen template to a plurality of child sub-screen templates, and store for a display screen a single pointer to the parent screen template which is instantiated for the display screen by instantiating the child sub-screen templates to which the parent screen template points. According to an example embodiment of the present invention, a single parent screen template can be both a leaf node and a parent node in the hierarchy. For example, a parent screen template can include its own display properties by virtue of which it can be considered a leaf node and further include pointers to child sub-screen templates to be instantiated for display in the display object displayed according to the display properties of the parent screen template, by virtue of which pointers it can be considered a parent node.

According to an example embodiment of the present invention, the system and method are configured for a user, e.g., a developer, administrator, or author, to modify a screen (or sub-screen) template, thereby effecting the change in all display screens maintained by the system and method using pointers for instantiation of the screen (or sub-screen) template.

According to an example embodiment of the present invention, the system and method are configured for a user, e.g., a developer, administrator, or author, to update an EPSS object associated with a screen or sub-screen template, thereby effecting the update for all display screens which the system and method determine are similar (according to a matching algorithm) to the screen and/or sub-screen with which the EPSS object is associated (as long as any further specified conditions are met).

For example, during the running of a target application, the system and method analyzes a display screen that is displayed or is about to be displayed to determine its sub-screen makeup. Each of the sub-screens is compared by a loose matcher to the template with which the EPSS object is associated. For example, according to an example embodiment, the system and method create a signature for each of the sub-screens of the running application based on its contents, e.g., user interface elements, and compare the signature to a signature of the template to determine if there is a match. As explained below, it is not necessarily required for there to be exact replication to determine the screen to be match. If a match is determined, then as long as other context conditions specified for the output of the EPSS object are met, the system and method outputs the EPSS object.

According to an example embodiment of the present invention, the system and method captures a program interaction as a re-playable simulation, for example, as described in the '007 patent, and further captures elements which the system and method categorizes, e.g., as user interface object, user interface text, data text, etc., for example, as described in U.S. patent application Ser. No. 13/419,170, filed Mar. 13, 2012 ("the '170 application"). According to an example embodiment, the system and method stores the captured elements of a display screen as a display screen template and/or as a pointer to a previously stored display screen template, and, if similar to but not an exact replica of a display screen of the previously stored display screen template, a modification script.

According to an example embodiment, the system and method strip all data text from a structure stored as a template. Accordingly, for any captured display screen which the system and method determine includes data text, even if a matching, e.g., similar, template is not found, so that the captured display screen is used to store a new template, the data text is stripped from the screen data for generation of the template, and the instantiation data structure pointing to the template and used for the captured display screen is provided with a modification script that, when executed on the template, adds back the stripped data text (or other modified text in an instance where a user modifies the modification script in an editing environment). The stripping of the data text improves the matching step because data text in most instances is not relevant for determining whether two screens are the same. That is, it is advantageous for the system and method to recognize as a match two screens that are essentially the same but differ with respect to data text.

According to an example embodiment, GUI type text, such as a control label, is not stripped out for use of such text as a consideration in the matching step.

According to an alternative example embodiment, even GUI type text is stripped for a looser type of matching.

For example, in an example embodiment, the system and method captures a screen and determines whether the screen is similar to that of a stored display screen template. If the system and method determine that the newly captured screen is not similar to that of a previously stored display screen template, the system and method stores the newly captured screen as a new display screen template. On the other hand, if the system and method determine that the newly captured screen is similar to that of a previously stored display screen template, the system and method stores the newly captured screen as a data structure including a pointer to the previously stored display screen template to whose display screen the system and method have determined the newly captured display screen is similar. To the extent the newly captured display screen is not identical to that of the previously stored display screen template, the system and method further include in the data structure a modification script to be run on the template for its modification to obtain the captured screen shot. For example, such modification can include insertion or deletion of objects, resizing of object, modifying another graphical or other characteristic of the object, and/or removal or addition of data text and/or user interface text. For example, according to the example embodiment in which, for example, all data text is removed from the templates, the modification script would provide for inserting data text for any display screen that is to include data text.

According to an example embodiment of the present invention, the comparison and storage steps can be performed on a sub-screen by sub-screen basis. For example, in an example embodiment, upon capture of a display screen, the system and method processes the captured screen into a plurality of sub-screens, for each of which the system and method perform the described comparison step. For each of the sub-screens for which the system and method determines there is a previously stored display (sub)screen template, the system and method stores for the newly captured display screen a pointer thereto (and/or a modification script), and for each of the sub-screens for which the system and method do not determine there to be a previously stored (sub)screen template, the system and method store the newly captured sub-screen (stripped of its data text according to an example embodiment) as a new display (sub)screen template.

According to an example embodiment, the system and method store a newly captured screen as a data structure including one or more pointers to display screen templates (which may include sub-screen templates). If the newly captured display screen includes a sub-screen for which the system and method do not determine there to be a previously stored template, the system and method store the newly captured sub-screen as a new display screen template, and store a pointer thereto in the data structure corresponding to the newly captured display screen.

As described above, according to an example embodiment of the present invention, the display screen templates are stored according to a hierarchical arrangement. According to that embodiment, in an example embodiment, the system and method determines whether the captured screen as a whole is sufficiently similar (which similarity is programmatically defined) to a stored display screen template as a whole. If the captured screen is determined to be sufficiently similar, the system and method store a data structure for the captured display screen which includes a pointer to the display screen template to whose display screen the system and method have determined the newly captured display screen to be similar (and, if not identical, a modification script). The display screen template can itself include pointers to further display screen templates for sub-screens. The data structure for the newly captured screen need not include pointers to the display screen templates of the sub-screens. Rather, according to an example embodiment, the data structure includes a pointer to the single parent display screen template, thereby indirectly pointing to the display screen templates of the sub-screens.

According to an example embodiment, if the system and method determine that a newly captured display screen includes sub-screens similar to previously stored display screen templates, but includes other sub-screens that are not similar to that of any of the previously displayed display screen template, the system and method store those captured sub-screens for which no matching templates are found as new display screen templates, and, for those sub-screens for which the system and method find a matching display screen template(s), store in the data structure pointers to the matching template(s). As noted above, a single template can be used for multiple sub-screens, the single template itself pointing to other display screen templates corresponding to the individual sub-screens.

According to an example embodiment, even for a newly captured display screen for all whose sub-screens the system and method do not find matching templates, the system and method store one or more display screen templates corresponding to the display screen and its sub-screens, and store for the captured display screen a data structure including pointers to the stored one or more display screen templates created based on the captured display screen.

According to an example embodiment, the hierarchy can include more than two levels. For example, a display screen template can point to other display screen templates which can themselves in turn point to other display screen templates, until a leaf node display screen template is reached which includes the object properties.

According to an example embodiment, after capture of the display screens and the storage of the data structures representing the captured screens, the system and method is configured to play back a simulation of captured application operation using the stored data structures to recreate the display screens as they were initially captured.

According to an example embodiment, the playback of one or several display screens recreated automatically based on instantiations of templates and/or executions of modification scripts includes displaying the same base screens as captured from the original application, but with new data text, for example, if the modification script is changed to cause insertion of data text different than that captured. Therefore, for example, a screen captured with a grid control containing 2 lines and 5 columns, can be played back with new data including 100 lines and 10 columns, the rest of the screen otherwise being identical to that which was initially captured.

According to an example embodiment, should the base program being simulated change with respect to a display screen or portion of a display screen defined or recognized as a sub-screen, a user can modify the relevant display screen template (which can be a sub-screen template). By the change to the template, all previously captured simulations which the system and method recognized include the same or similar display screen or sub-screen are automatically updated since their data structures point to the modified template.

For example, according to an example embodiment, the system and method provides an editing environment including a list of selectable display screen templates which can be user-selected, in response to which the system and method displays the respective template's properties, which the user can modify.

According to an example embodiment, besides for or instead of the described editing environment, the system and method provides for an automatic modification of a template. For example, according to an example embodiment, the system and method enable a user to select, in an editing environment, a stored template for modification, and instruct the system to capture a new display screen for generation based thereon of a new display screen template to replace the selected template.

In a software design environment, a software designer can modify a simulation to create a new software design as a new software specification as described in the '007 patent. For a change to be made in a screen or sub-screen that occurs in a large number instances, according to an example embodiment of the present invention, the designer need not make the change directly to all of the instances of the screen or sub-screen, but rather, using the methods described above, can input the change to a screen or sub-screen template, thereby effecting the change for all display screens instantiating the modified template.

According to an example embodiment of the present invention In an EPSS authoring environment, according to example embodiments using methods described above, for associating an EPSS object with a plurality of display screen instances, an author can define a context to be used by the system as a condition for outputting the EPSS object. For example, the author can associate an EPSS object with one or more GUI controls of a display screen and/or one or more data entries associated with such controls, e.g., a value range for data entered into a field. For example, an author can define that an EPSS object is to be output if a user enters a value of 1-500 in a particular field of a purchase order form, which value represents an order number and the range of 1-500 indicates that an old purchase order, perhaps bound by different constraints than newer purchase orders, is being referenced.

In an EPSS authoring environment, according to example embodiments using methods described above, for associating an EPSS object with a plurality of instances in which a display screen is provided and/or modifying an object to be provided with respect to a plurality of instances in which a display screen is provided, an author can associate an EPSS object with a display screen template or sub-screen template, thereby effecting association of the EPSS object with all cases in which the display screen of the running target application is considered to include a match of the display screen template or sub-screen template (as long as all author-specified conditions, if any, are met), or can modify an EPSS object associated with a display screen template or sub-screen template, thereby effecting the change of the EPSS object for all instances in which the display screen of the running target application is considered to include a match of the display screen template or sub-screen template (as long as all author-specified conditions, if any, are met).

For example, according to an example embodiment of the present invention, a system and method store a plurality of display screen templates and sub-screen templates. The system and method provide an EPSS authoring environment, in which a user can author an EPSS object and associate the object with one or more of the defined templates. In an example embodiment, the author can also, using the authoring environment, define conditions for activation of the object for the associated the screen or sub-screen templates. Thereafter, during running of the application, the system and method execute matching steps to determine whether any of the screen or sub-screen templates with which an EPSS object has been associated is matched by the displayed screen of the running target application, and, if so, activate the authored EPSS object as long as conditions defined by the author, if any, are satisfied.

The templates can be defined either manually or can be automatically generated by running the target application through an analysis application for analyzing screens and/or sub-screens for similarity as described above.

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination, and to generate any of the user interface displays described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, etc., or as a combination of one or more thereof. Additionally, some of the described methods can be performed by a processor on one device or terminal and using a first memory, while other methods can be performed by a processor on another device and using, for example, a different memory.

The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g., as described above, on which are stored instructions executable by a processor to perform the methods and/or provide the user interface features described herein.

An example embodiment of the present invention is directed to a method, e.g., of a hardware component or machine, of transmitting instructions executable by a processor to perform the methods and/or provide the user interface features described herein.

DETAILED DESCRIPTION

Figure 1:
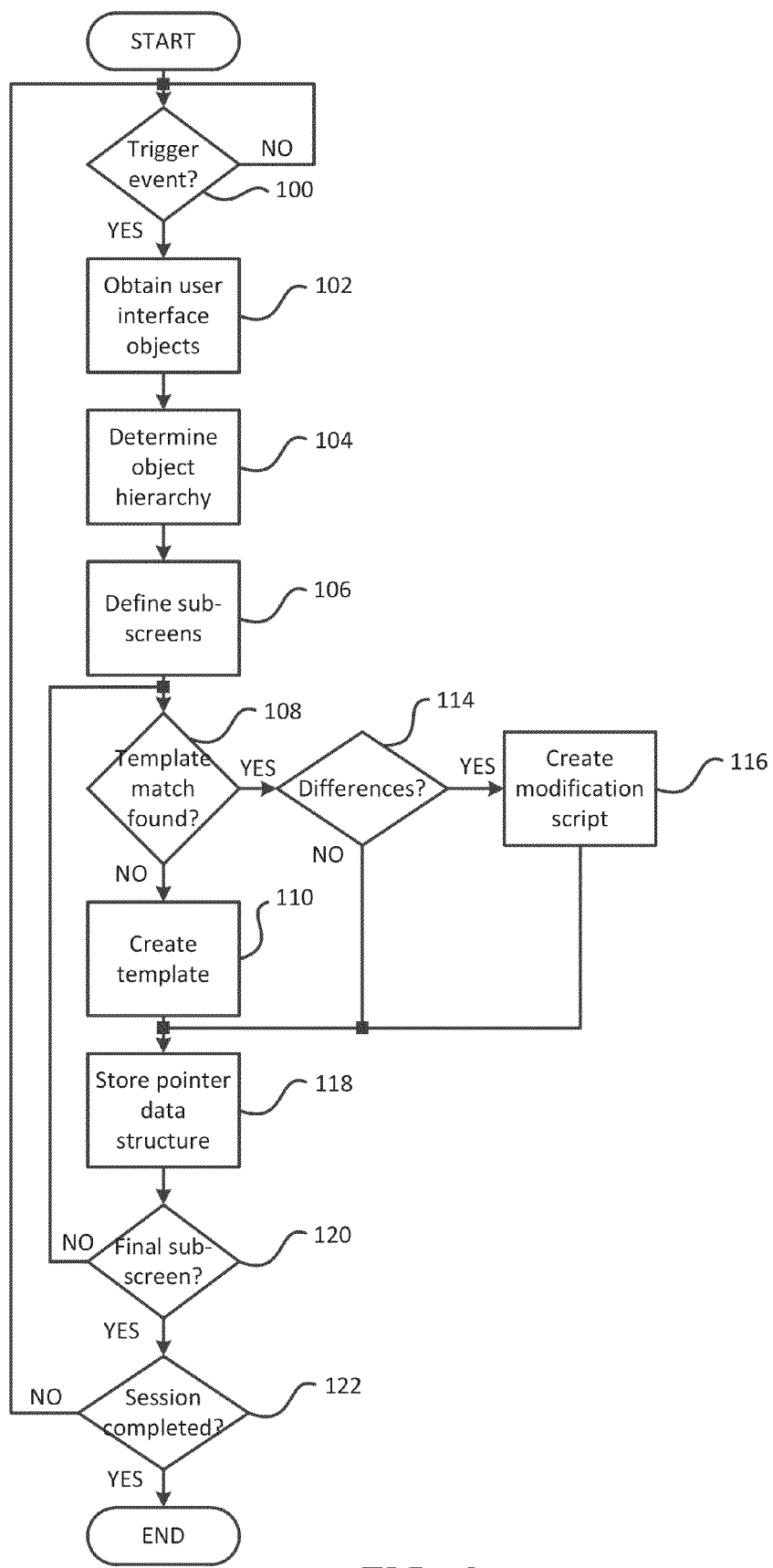
FIG. 1 is a flowchart that illustrates a method for creating an application simulation, according to an example embodiment of the present invention.

FIG. 1 is a flowchart showing an example method for generating a clone of a target application or portions thereof and converting the clone data according to a template and instantiation paradigm, by which modification of multiple display screens can be implemented via modification of a single display screen template. Although FIG. 1 illustrates the method as an integration of clone data capture steps and conversion steps for converting the captured data into the described display screen templates and template instantiation data, according to alternative example embodiments, those steps are divided into separate processes. For example, during a first process a processor executes a cloning algorithm to capture the cloning data and during a subsequent process the cloning data is processed by the processor by executing a conversion algorithm.

Additionally, while FIG. 1 shows steps for defining sub-screens of a captured display screen in addition to the steps for converting the captured data into templates and instantiation data, according to an alternative example embodiment, the conversion is performed on display screens as a whole without dividing screens into sub-screens. However, the division of a display screen into sub-screens increases efficiency.

Moreover, while FIG. 1 shows some steps of the cloning process, example embodiments of the cloning process include additional steps. For example, the '007 patent describes steps of capturing events, such as user interactions with user interface display screens, which are not further described herein because its description is not required for an understanding of the inventions described herein.

According to an example embodiment of the present invention, a cloning process includes obtaining, at step 100, a trigger event, such as that described in the '007 patent, triggering the processor to capture a user interface display screen. At step 102, the processor obtains user interface objects from the target application corresponding to the display screen displayed when the trigger event occurred, for example, as described in the '007 patent and/or in the '170 application.

At step 104, the processor determines a hierarchy of the obtained user interface objects using a suitably appropriate object hierarchy analysis algorithm. At step 106, the processor analyzes the object hierarchy to define sub-screens of the captured screen, as described in further detail below.

For each of the defined sub-screens, at step 108, the processor determines whether the sub-screen is sufficiently similar to a previously stored template to be considered a match, strict replication not being required to be considered a match. Example processes for determining whether sub-screens are matches are described in further detail below.

If a match is found, then, at step 118, the processor stores in a data structure corresponding to the captured display screen a pointer to the matching template. Additionally, if the captured display screen is not an exact replica of the matching template (step 114), the processor, at step 116, generates and, at step 118, stores in the data structure a modification script which defines steps to be executed for modification of the matching template to re-obtain the captured display screen.

If, at step 108, a match is not found, then, at step 110, the processor stores the captured data defining the captured sub-screen as a new display screen template, and further stores a data structure a pointer thereto, at step 118. Since the captured sub-screen itself is being stored as the template, a modification script is not necessary. The template and instantiation data generation steps are repeated at step 120 for all of the captured sub-screens.

Once the capturing session is ended at step 122, the captured template and instantiation data, including any modification scripts, and possibly further simulation script data which can define transitions between captured display screens and events, can be stored as a simulation of the target application.

Figure 2:
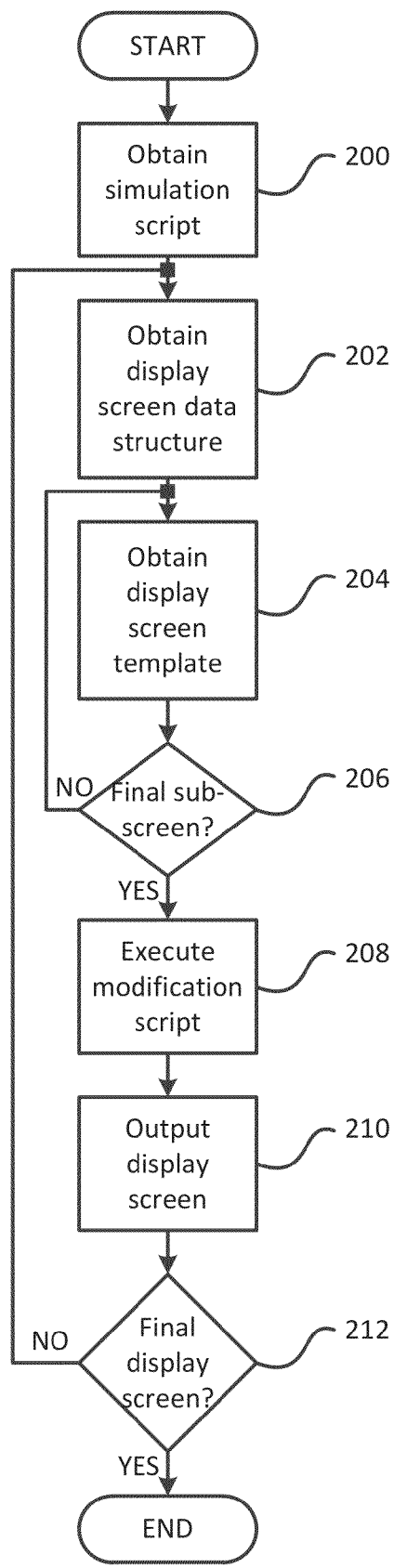
FIG. 2 is a flowchart that illustrates a method for playing a simulation, according to an example embodiment of the present invention.

FIG. 2 is a flowchart that illustrates an example method for executing a stored simulation. The illustrated steps include processing of sub-screen templates. However, as noted above, according to an alternative example embodiment, the simulation data is not divided into sub-screen data.

According to an example embodiment, at step 200, a processor obtains a simulation script for a simulation selected for playback. The simulation can include display of one or more display screens. For each display screen, the processor, at step 202 obtains a display screen data structure which includes data for one or more sub-screens. For each of the sub-screens, the processor, at step 204, obtains from memory and instantiates a display screen template referenced by the data structure. Templates are obtained until, at step 206, the final referenced template has been obtained.

At step 208, if the data structure includes one or more modification scripts, the processor executes the one or more modification scripts for modifying one or more of the instantiated templates. It can occur that a data structure corresponding to a display screen to be simulated does not include a modification script, in which case step 208 is skipped. Although the execution of the modification scripts at step 208 is shown to be performed after all of the sub-screen templates of the display screen to be simulated have been obtained, according to an alternative example embodiment, a modification script for one sub-screen can be executed before or simultaneous to obtaining another of the sub-screen templates.

At step 210, the processor displays the display screen generated by the instantiation of the templates as modified by execution of modification scripts, if any. At step 212, the processor continues to perform the described steps for additional display screens to be simulated in a sequence defined in the simulation script, if more than one display screen is defined therein, until the final display screen of the simulation script is displayed.

Figure 3:
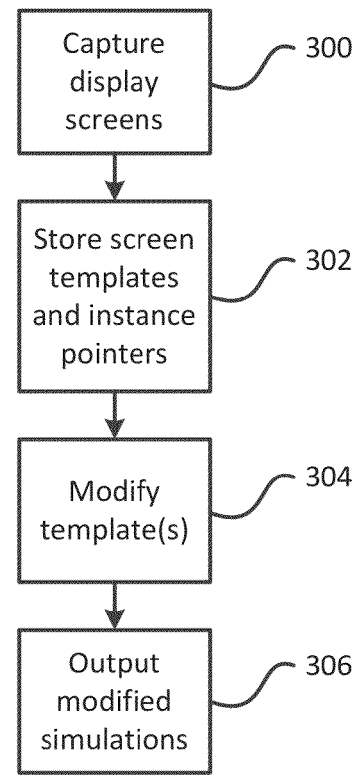
FIG. 3 is a flowchart showing a lifecycle of display screens according to an example embodiment of the present invention.

FIG. 3 shows an example possible life cycle of a simulation facilitated by features of an example embodiment of the present invention. At step 300, a processor captures display screens, for example, as described with respect to FIG. 1. At step 302, the processor stores screen templates and, in instantiation data structures, pointers to the templates, for example, as described with respect to FIG. 1. At step 304, a system user, e.g., a software designer modifies one (or more) of the templates. At step 306, a simulation script is executed, for example, as described with respect to FIG. 2, the simulation script including one or more instantiation data structures with one or more pointers to the modified template, thereby outputting a simulation in which all of the display screens of the instantiation data structures of the simulation that point to the modified template are accordingly modified as compared to the display screen(s) captured at step 300 for generation of the simulation script.

Figure 6:
FIGS. 6-8 show screenshots of an editing environment in which screen templates are editable, according to an example embodiment of the present invention.
Figure 7:
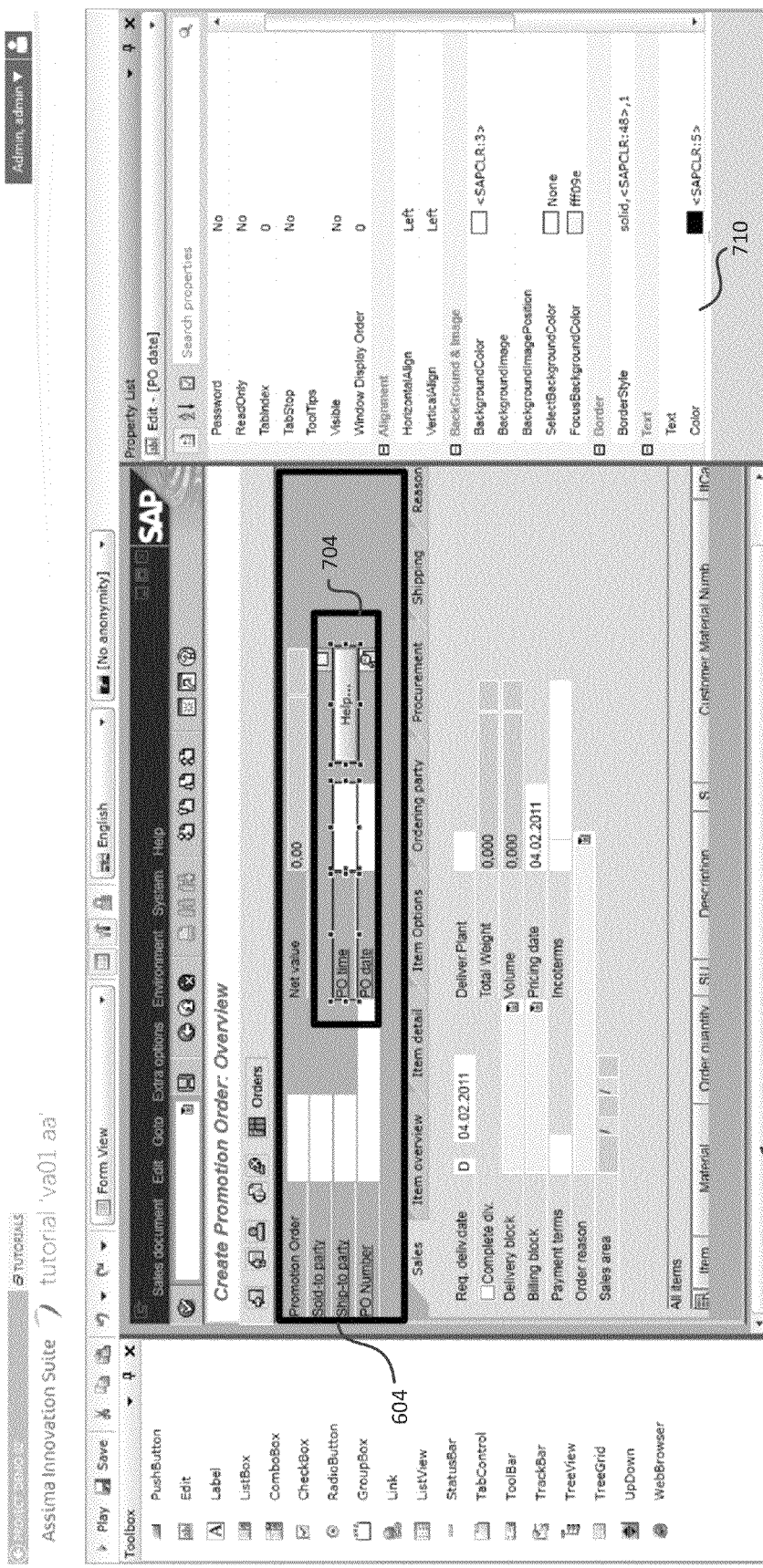
Figure 8:
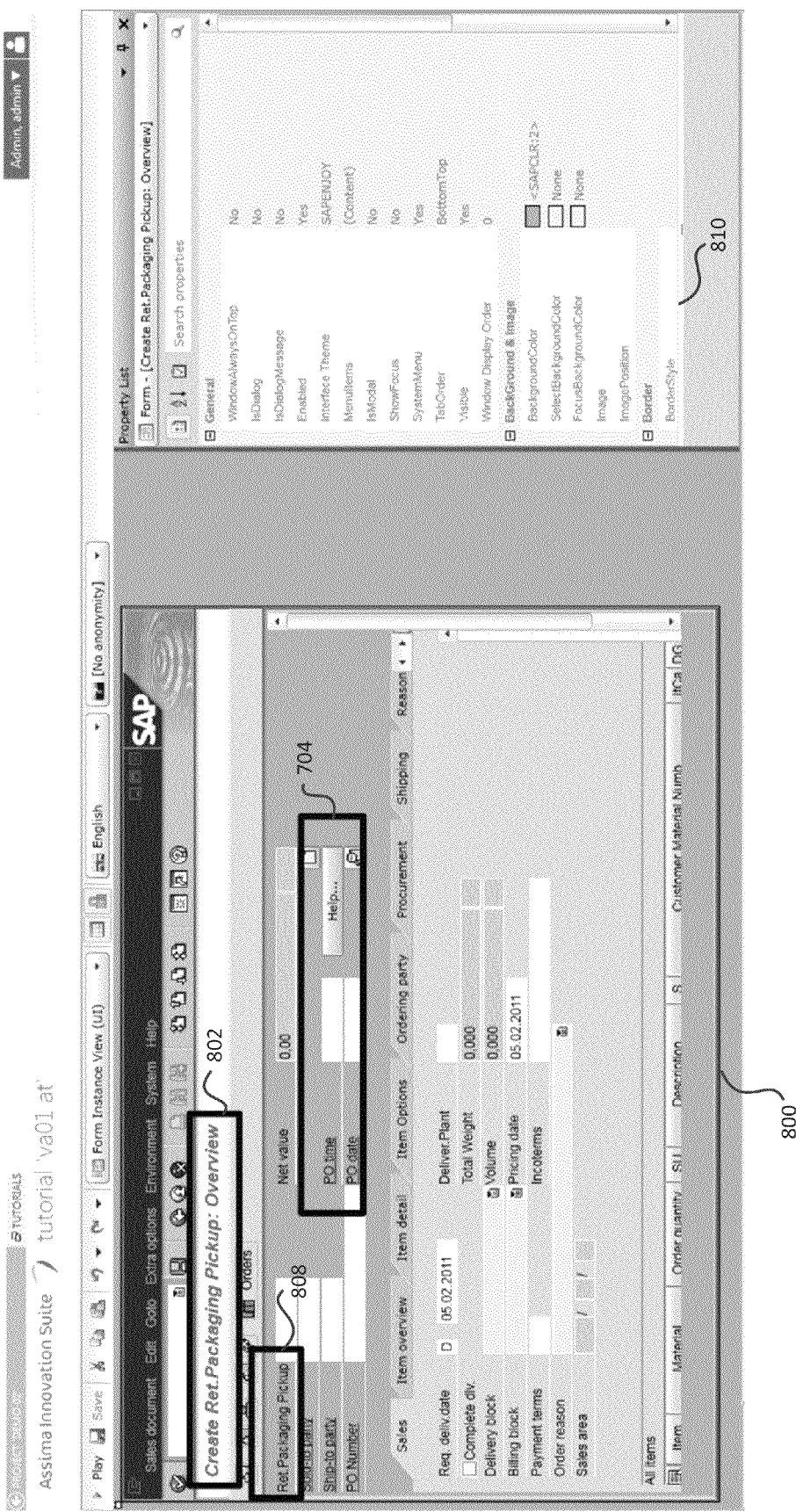

According to an example embodiment, the modification at step 304 is performed by the processor receiving user input in an editing environment, the user input including selection of a screen, sub-screen, or object, and manual input of modified properties of the selected element, for example, in a property editing frame, such as frames 610, 710, and 810 shown in FIGS. 6-8. Additionally, or according to an alternative example embodiment, the system and method provides for input selecting a screen with an instruction (e.g., a new trigger event as described with respect to step 100 of FIG. 1) to perform a new capture of a display screen, the processor accordingly capturing the display screen of the target application displayed at the time of the trigger event and replacing the template for the selected screen with a new template based on the newly captured screen. Alternatively, selection by the user of the screen is omitted. Instead, the user inputs a capture instruction in an editing environment as a replacement instruction, and the system responsively captures a screen, parses the screen into sub-screens (according to the embodiments supporting such parsing), matches the sub-screens (or screen) as described with respect to step 108 of FIG. 1, and, for any of the sub-screens (or screen) for which a match is found, replaces the previously stored matching sub-screen (or screen) with a new template based on the newly captured sub-screen (or screen).

Figure 4:
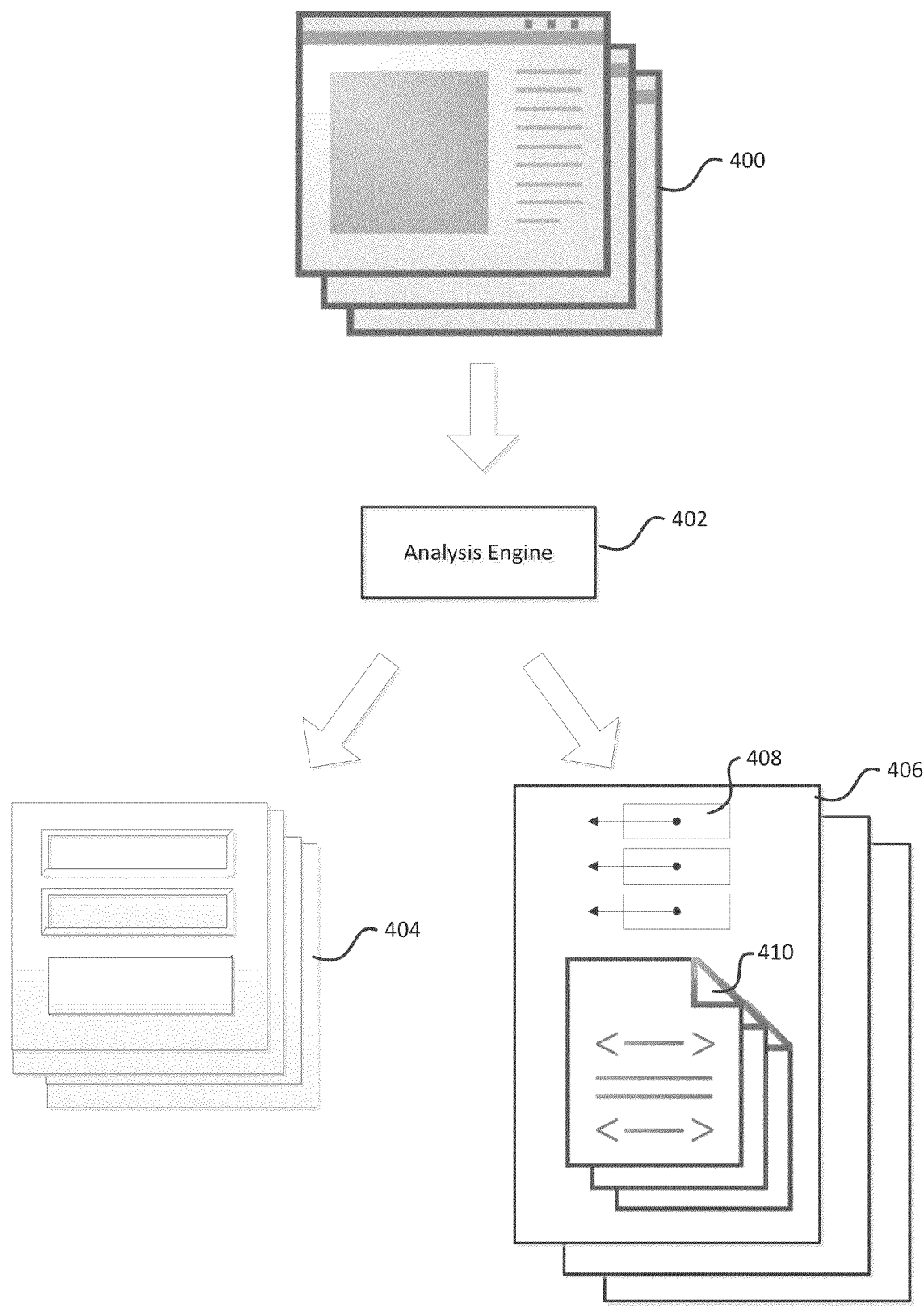
FIG. 4 shows a data flow for processing captured display screens, according to an example embodiment of the present invention.

FIG. 4 is a diagram that illustrates a data flow according to an example embodiment of the present invention. In an example embodiment, display screens 400 of a target application are input to an analysis engine, which converts the display screens into a collection of display screen templates 404 and instantiation data structures 406 processed to output copies of the display screens 400. The instantiation data structures 406 include pointers 408 which point to respective ones of the templates 404, and further include modification scripts 410 for any of the screens whose properties are different than the referenced templates 404. According to an example embodiment, a single one of the instantiation data structures 406 corresponding to a single display screen 400 can include more than one pointer 408, each pointer referencing a respective sub-screen template 404, for, in combination, regenerating the display screen 400. A non-exhaustive list of example modifications performable to an instantiated template 404 by execution of a modification script 406 includes insertion of a user interface object, removal of a user interface object, insertion of text, deletion of text, resizing of an object, recoloring an object, etc.

FIG. 6 is an example screenshot 600 of an example editing environment in which a user can edit sub-screens according to an example embodiment of the present invention. According to an example embodiment, the editing environment includes a user-interactive display in which a display screen is displayed, which displayed display screen includes a plurality of selectable screen objects. The editing environment, according to an example embodiment, includes a property editing frame, e.g., frame 610 in FIG. 6, in which the user can enter and/or modify properties of a selected object of a display screen and/or properties of a display screen or sub-screen selected as a whole. Such a modification is reflected in a stored screen or sub-screen template and accordingly is propagated to all display screens that are generated by instantiations of the modified template.

For example, according to an example embodiment in which the system and method parses a display screen into a plurality of sub-screens, a change to a sub-screen template, such change including, for example, an object insertion, an object deletion, an object modification, and/or a form characteristic modification, e.g., a modification of a background color, a size, and/or a position, is propagated to all display screens formed by instantiations of the changed sub-screen.

For example, the screenshot of FIG. 6 shows an editable version of a display screen including a plurality of sub-screens. Two of the sub-screens, sub-screen 604 and sub-screen 602 have been demarcated in FIG. 6. Sub-screen 602 includes a tool bar which can be presented in many display screens whose other sub-screens can greatly vary between the different ones of the many display screens. Similarly, sub-screen 604 includes an order sub-screen which can be included in many different display screens. According to an example embodiment, the system and method parses a display screen of an application into sub-screens, stores templates of those sub-screens and instantiation data structures pointing to the templates, and provides an editing environment, for example, such as the one shown in FIG. 6 in which a user can select the sub-screens or objects therein for modification of the sub-screen templates, thereby propagating the modification to all of the instantiation data structures referencing the modified template. For example, should the user modify a property of the tool bar sub-screen 602 or of an object therein, according to an example embodiment, such change is made to the tool bar sub-screen 602 template and thereby propagated to all display screens generated based on instantiation data structures that reference the tool bar sub-screen 602 template.

For example, FIG. 7 shows a screenshot 700 of the display of the editable version of the display screen of FIG. 6 in the editing environment after a user has added to the sub-screen 604 a "PO time" object, an edit field object, and a "Help" button object. Instead of requiring the user to enter the change for each and every display screen of a simulation which includes the order sub-screen 604, the user need only enter the change once, the change being made by the system to a template for the order sub-screen 604, and subsequently being reflected in all display screens generated based on instantiation data structures referencing the order sub-screen template 604.

Similarly, FIG. 8 shows a screenshot 800 of a display of an editable version of a display screen similar to that of FIG. 7 in the editing environment, except that this display screen differs from that of FIG. 7 with respect to a display screen label 802 and a label 808 of an object of the order sub-screen 604. Although the display screen is different than the one of FIG. 7, the change entered by the user by interaction with the display screen of FIG. 7 has been propagated to the display screen of FIG. 8 because both display screens instantiate the same templates.

In an example embodiment, if the user enters changes to two sub-screens of the displayed editable version of a display screen, the system accordingly modifies the respective templates of the two sub-screens, to be subsequently reflected in each of the display screens that are generated using instantiation data structures referencing either of the modified sub-screens.

It is noted that although the templates and instantiation data structures have been described above as being used for generating simulations of a cloned target application, according to an alternative example embodiment, the template and instantiation paradigm, including the modification scripts, are used for the target application itself, so that as a user interacts with a user interface application, the navigable interface display screens are generated in real time by instantiating sub-screen templates and modifying the instantiated templates, if necessary, by executing modification scripts. Accordingly, display screens of a target application can be easily modified by modifying underlying sub-screen templates.

It is noted that different sub-screens need not be confined to separate display areas. For example, one sub-screen can be displayed within the display of another sub-screen. For example, a frame can be a sub-screen and a tool-bar which is to be displayed within the frame can be another sub-screen.

According to an example embodiment of the present invention, a system and method provide an authoring environment by which a user is able to author EPSS objects, for example, tip or warning objects, in accordance with which tips or warnings are to be output, e.g., via display or audio, to a user of a target application. According to an example embodiment of the present invention, a screen or sub-screen (and/or a particular object therein) is user selectable for association thereto of an EPSS object. For example, the user can specify that an EPSS object is to be output when a user navigates to a particular sub-screen. The author can further specify additional conditions. For example, the author can specify that the object's output is conditional upon specified characteristics of the user profile of the user interacting with the target application, upon interaction with a particular control or field, e.g., of the sub-screen, upon a specified value or value range of data of a particular data field, e.g., of the sub-screen, and/or a particular navigation sequence by which the user arrived at the display screen.

The EPSS association need not be entered by the author separately for each display screen in which the sub-screen is included. Additionally, the EPSS association need not be entered by the author separately for each of a plurality of display screens that slightly vary from each other. Rather, a single user-input association can be made for association by the processor with a plurality of display screens.

Figure 5:
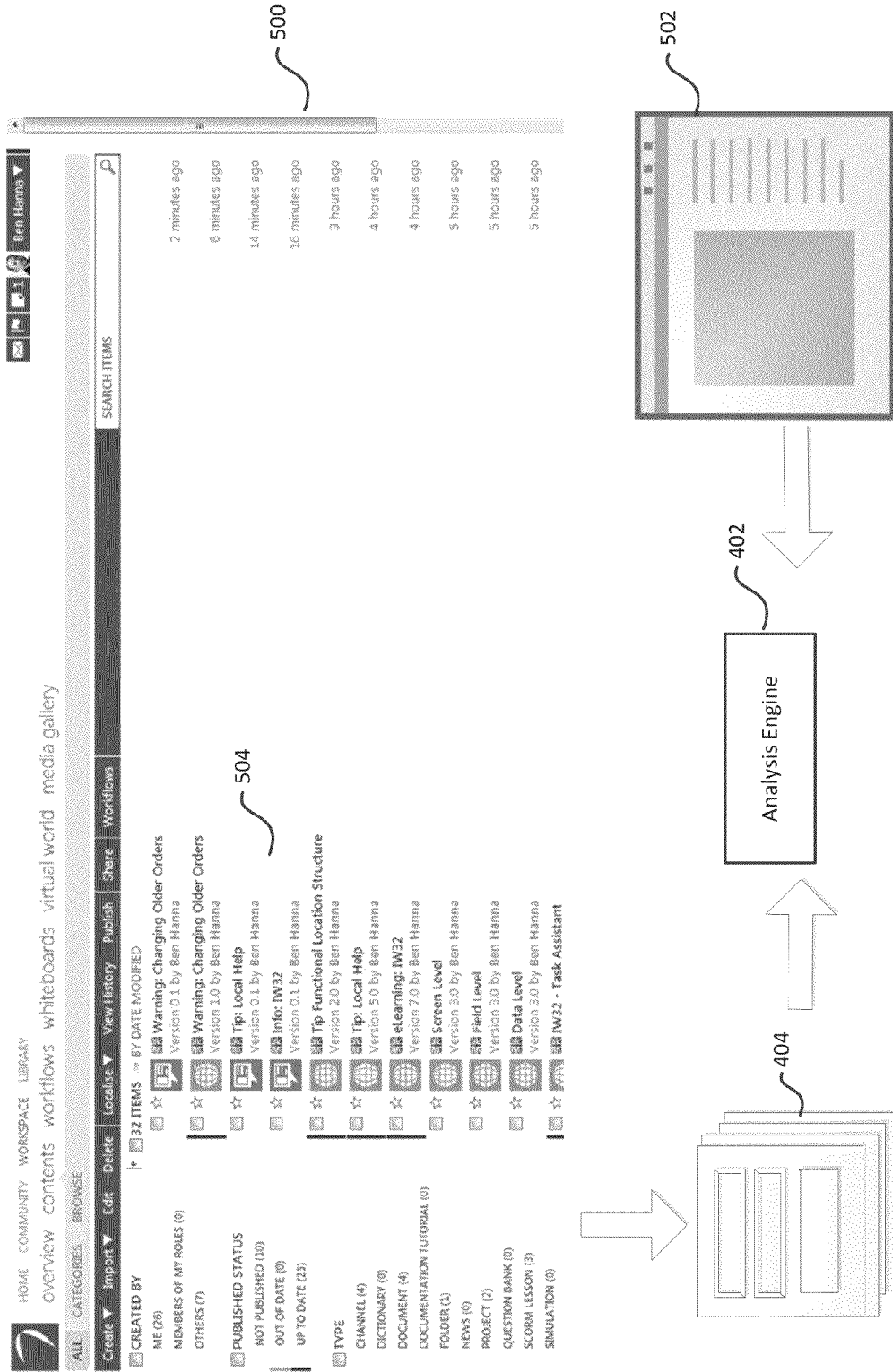
FIG. 5 shows a data flow for processing a display screen in an EPSS environment, according to an example embodiment of the present invention.

FIG. 5 shows an example data flow for an EPSS system according to an example embodiment of the present invention. In an example embodiment, the system and method provide a user interactive EPSS object authoring environment 500 in which EPSS objects 504 can be created, selected, and edited. In an example embodiment, the authoring environment provides a user interactive interface by which a user can set screen and/or sub-screen associations for a selected EPSS object and/or set conditions for output of the selected EPSS object.

The EPSS system stores a set of screen and/or sub-screen templates 404 selectable in the authoring environment for association thereto (and/or to objects therein) by the author.

The EPSS system includes an analysis engine 402, which, during running of the target application, parses a display screen 502 of the target application into the screen and/or sub-screen data as described with respect to FIG. 1 and determines whether the screen and/or sub-screens match any of the templates 404, e.g., as described with respect to step 108 of FIG. 1. If a match is found, then, if any EPSS object is associated with the matched template, the processor outputs the EPSS object(s) (as long as any other defined conditions are satisfied).

Accordingly, if a sub-screen is included in a number of different display screens of the target application, the EPSS object's association with the sub-screen can result in its output for all of those different display screens. Additionally, even if the sub-screen slightly differs in different ones of the display screens, a single association of the EPSS object with the sub-screen template can result in its display for all of those different ones of the display screens.

According to an example embodiment, an EPSS object is output in a training environment in which a simulation is played. For example, the system captures display screens of a target application, stores the display screens as screen templates and instantiation data structures, and allows for authoring of EPSS objects to be associated with the screen templates, so that upon execution of a simulation script or "storyboard," the captured display screens are re-generated by instantiating screen templates according to the instantiation data structures and are further modified for output of the EPSS objects associated with the instantiated screen templates.

Regardless of for which of the above-described applications the template and instantiation data structure is applied, a further organizational layer can be added whereby templates or instantiation data structures are hierarchically arranged. For example, a first instantiation data structure can be stored which references a plurality of child instantiation data structures, one or more of which can themselves further reference other child instantiation data structures, until leaf node instantiation data structures are reached which reference sub-screen templates. Accordingly, according to an example embodiment of the present invention, the system and method generates the display screen corresponding to the first instantiation data structure by instantiating the sub-screen templates referenced by all of the leaf node instantiation data structures. According to an example embodiment of the present invention, the instantiation data structures of the hierarchy include further arrangement data indicating how the various referenced sub-screen templates are to be arranged in combination.

According to an alternative example embodiment, the templates are hierarchically arranged and different instantiation data structures corresponding to different display screens reference different display screen templates, which display screen templates further reference different combinations of sub-screen templates.

Referring again to step 106 of FIG. 1, the system and method, according to example embodiments of the present invention, automatically parses a display screen into sub-screens. For example, according to an example embodiment of the present invention, the system and method uses any suitably appropriate method for analyzing user interface objects of a display screen of a target application to determine the hierarchical organization of the objects. In this regard, some of the objects of a display screen are container objects which contain further user interface objects, while other objects of the display screen are leaf node objects that do not contain further user interface objects. For example, a frame can contain within it further objects, such as buttons, other controls, and/or edit fields, whereas a button, for example, typically does not contain within it further user interface objects. According to an example embodiment, the system and method executes an algorithm to determine whether an object of the display screen is a sub-screen based on programmed conditions referring to hierarchical position of the object and/or the object's status as a container.

For example, according to an example embodiment of the present invention, the system and method sets the object of a display screen which is at the top of the hierarchy as a sub-screen regardless of its status as a container. According to an alternative example embodiment of the present invention, the system and method sets an object of the display screen as a sub-screen conditional upon that it is a container. According to an alternative example embodiment, a combination of features of the prior two embodiments is used whereby the system and method sets an object of a display screen as a sub-screen conditional upon that the object is either at the top of the hierarchy of objects of the display screen or otherwise is a container. According to either of the prior two embodiments referring to a condition of an object being a container, a further example variant of the embodiments is that the container object is set as a sub-screen conditional upon that the container includes at least two objects of which at least one is itself a container. According to an alternative example variant, a first container object is set as a sub-screen conditional upon that either (a) none of the objects included in the first container object is itself a container object, or (b) where the first container object does include another container object, the first container object includes more than one object.

Accordingly, according to an example embodiment, the system and method set an object as a sub-screen conditional upon that (a) the object is at the top of the object hierarchy, (b) the object contains at least one further object of which none is itself a container object, or (c) the object contains at least two further objects.

According to an alternative example embodiment, the system and method is programmed with a list of object types which are to be set as sub-screens. For example, a tabsheet object, for example, an object corresponding to one of the tabs shown at the lower portions of the display screens in FIGS. 6-8, is an example of an object which the system and method can be programmed to set as a sub-screen. Additionally or alternatively, the system and method, according to an example embodiment, is programmed with object types to never be considered sub-screens, e.g., buttons. According to an example embodiment, the system and method include an analyzer module for analyzing objects of captured data of the target application and accordingly mapping the objects of the target application to the objects predefined to be set or not to be set as sub-screens.

Example embodiments include combinations of the above embodiments. For example, an example embodiment provides for setting an object as a sub-screen conditional upon that the object either (a) is at the top of the hierarchy or (b) otherwise either (i) satisfies one of the above-described generic container based conditions and is not one of the object types defined to never be set as a sub-screen or (ii) is one of the object types defined to be set as a sub-screen.

Referring again to step 108 of FIG. 1, the system and method, according to example embodiments of the present invention, determines whether a particular display screen or sub-screen is sufficiently similar to a display screen or sub-screen of a previously stored template for storing an instantiation data structure pointing to the previously stored template as a representation of the particular display screen or sub-screen, or if the particular display screen or sub-screen is too dissimilar to those of the previously stored templates, requiring the generation of a new display screen and/or sub-screen template based on the particular display screen or sub-screen.

For example, according to an example embodiment of the present invention, the system and method generate, based on the characteristics of a, for example, newly captured display screen or sub-screen, a signature representative of the contents of the display screen or sub-screen, and further similarly generates a signature for the display screens or sub-screens of the stored templates. The generation of the signatures for the templates can be performed at the time of the comparison or can be stored with the templates. The system and method then compares the signature generated for the newly captured display screen or sub-screen to the signatures associated with the templates. If a distance between the signature of the newly captured display screen or sub-screen to a signature of one of the templates is not greater than a predefined threshold distance, the system stores as a representation of the newly captured display screen or sub-screen an instantiation data structure that references the template whose signature distance meets the threshold requirement. For example, Charikar, "Similarity Estimation Techniques from Rounding Algorithms," STOC'02 (Mar. 19-21, 2002), which is incorporated by reference herein in its entirety, describes measuring a Hamming distance between hash vectors. According to an example embodiment, if the signature of the captured display screen is within the threshold distance of the signatures of more than one of the templates, the instantiation data structure for the captured display screen is set to point to the template whose signature is at the closest distance to the signature of the captured display screen.

According to an example embodiment, the system and method generate the signatures selectively based on certain components and/or characteristics of the display screens, ignoring other components. For example, according to an example embodiment of the present invention, the system and method strip out text from the display screen, e.g., as described in the '170 application, before generation of the signatures, so that data text is not a factor in the signature generation. According to an example embodiment, all text, whether data type text or user interface type text, is stripped out before signature generation.

In an example embodiment, the templates maintain the text, but the signatures are generated on a version of the template having the text stripped therefrom. According to an alternative example embodiment, the data is stripped from the templates altogether, all, for example, data text to be included being driven by the modification script executed on the instantiated template.

According to an example embodiment, the system and method generalizes certain user interface characteristics and performs the signature generation based on the generalized characteristics, rather than the raw form characteristics, which further increases the probability of display screens being determined to match. For example, placement of a button at a particular x,y position can be generalized to its placement in a particular x,y quadrant. Additionally or alternatively, according to an example embodiment, the system and method is programmed to strip out other predefined characteristics before application of display screen data as input for generation of the signature.

According to an alternative example embodiment, the comparison is performed on raw data without generation of a signature, by comparison of included objects and their characteristics, with pre-programmed difference allowances, e.g., acceptable distances between control or field positions, acceptable differences in control or field size, acceptable differences in number and type of included controls or fields, acceptable differences in other property definitions, such as whether an included button is enabled or disabled in the display screen, etc. According to this embodiment, as well, an example variant provides for the stripping out or generalization of certain elements prior to performance of the comparison.

According to an example embodiment, the system and method provides an administrative interface in which a user can set preferences regarding types of allowances. For example, the user can set whether the "enabled" property of an object included in two screens should be considered when determining whether screens are matches.

According to an example embodiment of the present invention, a modification script can include information for modifying a template to include data text of the captured screen. Alternatively, data text of the captured screen is not used for the modification script, for example, to allow for the template to dictate the inclusion of generic data text to be included, for anonymity purposes. In yet another alternative, data text is stripped from screen templates, all data text being dictated by modification scripts. Accordingly, if a change is to be manually made to data text from that which was initially captured, a user would enter such change to a modification script in an editing environment.

According to an example embodiment of the present invention, a modification script can include information for modifying a template to include user interface text/labels of the captured screen. Alternatively, user interface text of the captured screen is not used for the modification script, for example, to allow for the template to dictate the inclusion of interface in different languages. According to an example embodiment, a plurality of versions of a template including the same text in different languages are stored, whereby during runtime of a simulation one of the languages can be selected. According to an alternative example embodiment, the modification script is used for changing text if the text of the captured screen does not correspond to the text of the template even in different languages, but does not indicate a required change in text if the text of the captured screen includes text like that of the template but in a different language. Instead, during runtime a language can be selected and a translator program can be executed to output the text in the selected language.

If a user enters a change to a display screen using the editing environment, for example, as described with respect to FIGS. 6-8, the change is made to a screen template, and therefore propagated to all instantiation data structures referencing the modified template, as described above. However, it can occur that an entered change is not intended to be made for one or more of the instantiations. Accordingly, an example embodiment of the present invention provides an editing environment using which a user can manually add or modify modification scripts of instantiation data structures, for example, to cause the processor, when executing the script, to modify, for the particular instantiation, the revised template to undo the change entered by the user to the template.

According to an example embodiment of the present invention, the system and method provides a capture editing interface in which a captured display screen is reproduced as an editable version and in which object properties are displayed and editable as described with respect to FIGS. 6-8, including designations of an object as data text and/or user interface text. Accordingly, according to an example embodiment of the present invention, the system and method captures data corresponding to a display screen of a target application, e.g., for a simulation thereof, and performs the matching step to determine whether there exists in a data store a template to which the captured data corresponds, where the matching is performed based on an initial determination of the types of various interface objects of the captured data, e.g., as data text, user interface text, etc. However, in the editing mode, a user is able to re-designate an object. If the matching step is initially performed based on a first designation of object type which is then modified by the user, the system and method, according to an example embodiment, re-performs the matching step for the screen or sub-screen to determine whether it corresponds to another screen template.

Similarly, according to an example embodiment, if the analysis for parsing a captured screen into sub-screens is based on object properties which are modified by the user in the editing environment, the system and method responsively re-perform the analysis possibly re-dividing the display screen into different sub-screen divisions, which can also effect the matching analysis, so that, according to an example embodiment, the system and method also responsively re-perform the matching steps in accordance with the new division of sub-screens.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method, comprising:
    responsive to a first application triggering event during execution of a computer program, the first application triggering event triggering a display of a first user interface display screen:
        obtaining, by a computer processor, a first instantiation data structure including a pointer to a first screen template that is stored in a data storage accessible by the processor and that identifies a first plurality of user interface graphical objects;
        processing, by the processor, the first instantiation data structure, the processing of the first instantiation data structure including obtaining and instantiating the first screen template pointed to by the first instantiation data structure; and
        outputting, by the processor and in a display device, the instantiated first screen template; and
    responsive to a second application triggering event during execution of the computer program, the second application triggering event triggering a display of a second user interface display screen:
        obtaining, by the processor, a second instantiation data structure including a pointer to a second screen template that is stored in the data storage, points to the first screen template, and identifies or references a second plurality of user interface graphical objects;
        processing, by the processor, the second instantiation data structure, the processing of the second instantiation data structure including obtaining and instantiating the second screen template pointed to by the second instantiation data structure, wherein the instantiation of the second screen template includes instantiating the first screen template; and
        outputting, by the processor and in the display device, the instantiated second screen template.

2. The method of claim 1,
wherein the first instantiation data structure includes a modification script, and the processing of the first instantiation data structure includes executing the modification script to modify the instantiated first screen template.

3. The method of claim 2, further comprising:
modifying the modification script in accordance with a user input instruction.

4. The method of claim 2, wherein the instantiation of the first screen template and the execution of the modification script are both performed for a static display of the first user interface display screen.

5. The method of claim 1, further comprising:
obtaining an application simulation script for simulation of a portion of a target application, wherein:
    the obtaining and processing of the first and second instantiation data structures are performed according to a processing of the application simulation script; and
    the first and second instantiation data structures are referenced in, and obtained in a sequence defined by, the application simulation script.

6. The method of claim 1, wherein the first instantiation data structure is one of a plurality of instantiation data structures obtained for generation and display of the first user interface display screen, each of the plurality of instantiation data structures referencing a different respective screen template, the first user interface display screen being constructed of a combination of instantiations of the respective screen templates of the plurality of instantiation data structures.

7. The method of claim 6, wherein one or more of the plurality of instantiation data structures includes a respective modification script to be executed to modify the respectively instantiated screen template for the construction of the first user interface display screen.

8. The method of claim 7, wherein at least one of the modification scripts identifies data text to be entered by the processor.

9. The method of claim 8, further comprising:
capturing display screen data that includes data text;
generating modified display screen data by removing all of the data text from the captured display screen data; and
storing the modified display screen data as at least a portion of the screen templates.

10. The method of claim 1, further comprising:
capturing display screen data that includes data text;
generating modified display screen data by removing all of the data text from the captured display screen data; and
storing the modified display screen data as at least a portion of the first screen template;

wherein:
the first instantiation data structure includes a modification script to be executed to modify the instantiated first screen template for the display of the first user interface display screen;
the modification script identifies data text to be entered by the processor; and
data text of the first user interface display screen output using the first template instantiation is different than the data text of the captured display screen data.

11. The method of claim 1, further comprising:
obtaining user input of a modification instruction for modifying the first screen template;
responsive to the user input, updating the first screen template; and
subsequently, outputting modified versions of the first and second user interface display screens by processing the first and second instantiation data structures to obtain and instantiate the modified first screen template.

12. The method of claim 11, wherein a plurality of different user interface display screens are generated for display by processing respective instantiation data structures that each includes a pointer to the first screen template.

13. The method of claim 1, wherein a plurality of different user interface display screens are generated for display by processing respective instantiation data structures that each includes a pointer to the first screen template.

14. The method of claim 1, further comprising:
during execution of a target application, capturing data corresponding to a displayed display screen; and
generating the first and second instantiation data structures and the first and second screen templates based on the captured data.

15. The method of claim 14, further comprising:
generating a modification script based on a first portion of the captured data and not a second portion of the captured data, wherein the first and second screen templates are based on the second portion of the captured data and not the first portion of the captured data.

16. The method of claim 1, further comprising:
during execution of a target application, capturing data corresponding to a displayed display screen; and
based on the captured data, determining whether the display screen to which the captured data corresponds satisfies at least one criterion by which the display screen is considered to match to any of a plurality of previously stored screen templates, wherein a new screen template is generated for the captured data conditional upon that the determination is that the at least one criterion is not satisfied.

17. The method of claim 1, further comprising:
during execution of a target application, capturing data corresponding to a displayed display screen; and
based on the captured data, determining whether the display screen to which the captured data corresponds satisfies at least one criterion by which the display screen is considered to match to any of a plurality of previously stored screen templates, wherein, conditional upon that the determination is that the at least one criterion is satisfied, an instantiation data structure including a pointer to the determined matching one of the previously stored screen templates is generated for the captured data.

18. The method of claim 1, further comprising:
in accordance with the instantiation of the first screen template, generating a signature of the first user interface display screen that identifies a context based on user interface components and data components of the instantiated first screen template.

19. The method of claim 18, further comprising:
outputting a user tip object associated with the identified context.

20. A computer-implemented simulation generation method, comprising:
during execution of a target application, capturing, by a computer processor, data corresponding to a displayed display screen of the target application;
determining, by the processor, whether a portion of the displayed display screen to which a portion of the captured data corresponds satisfies at least one criterion by which the display screen is considered to match to any of a plurality of previously stored screen templates; and
for the portion of the captured data, generating and storing, by the processor, a respective instantiation data structure referencing a screen template, the instantiation data structure being subsequently processable by the processor for instantiating the referenced screen template during playing of a simulation of the target application, wherein (a) the referenced screen template is one of the plurality of previously stored screen templates conditional upon that the determination is that the at least one criterion is satisfied and (b) the referenced screen template is not one of the plurality of previously stored screen templates and is generated based on the portion of the captured data if the determination is that the at least one criterion is not satisfied.

21. The method of claim 20, further comprising:
responsive to the determination being that the at least one criterion is satisfied, if the portion of the displayed screen to which the portion of the captured data corresponds is different than a display screen region of the matching screen template for which the at least one criterion was considered to be satisfied by the captured data, generating a modification script whose execution results in modification of an instantiation of the display screen region of the matching screen template to re-obtain the portion of the displayed screen to which the portion of the captured data corresponds.

22. The method of claim 20, further comprising:
dividing the captured data into a plurality of portions, each corresponding to a respective sub-screen of the displayed display screen, wherein a respective instantiation data structure, each including a respective pointer to a respective display screen template, is stored for each of the respective sub-screens for, in combination, instantiating the display screen templates referenced by the instantiation data structures of the sub-screens to reconstruct the display screen during the playing of the simulation.

23. The method of claim 22, wherein, for each of one or more of the plurality of portions, the respective instantiation data structure further includes a modification script to be executed to modify the respective instantiated sub-screen template for the reconstruction of the display screen.

24. The method of claim 20, further comprising:
removing objects identified as data text from the captured data, wherein the determining is based on the removal.

25. The method of claim 20, further comprising:
obtaining, by the computer processor, user-input of an instruction to modify a characteristic of a portion of a display screen; and
responsive to the instruction, modifying, by the processor, the referenced screen template, wherein the referenced screen template is referenced by a plurality of stored instantiation data structures according to which the referenced screen template is instantable for creation of a respective plurality of different user interface display screens.

26. The method of claim 25, further comprising:
displaying an editable version of one of the plurality of different user interface display screens in an editing interface, wherein the instruction is input by:
user selection of an object of the displayed editable version of the one of the plurality of different user interface display screens; and
input of property data for the selected object.

27. The method of claim 25, further comprising:
obtaining user-input of a second instruction to modify a second characteristic of the portion of the display screen;
responsive to the second instruction, modifying, by the processor, a modification script of one of the plurality of stored instantiation data structures that references the referenced screen template, which modification script is used for modifying an instantiation of the referenced screen template.

28. The method of claim 27, wherein the modification to the modification script corresponds to a change in a user interface object of the instantiation.

29. The method of claim 27, wherein the modification to the modification script corresponds to a change in data text of the instantiation.

30. A computer-implemented display screen modification method, comprising:
obtaining, by a computer processor, user-input of an instruction to modify a characteristic of a portion of a display screen; and
responsive to the instruction, modifying, by the processor, a stored first screen template, wherein the first screen template is referenced by a plurality of stored instantiation data structures according to which the first screen template is instantable for creation of a respective plurality of different user interface display screens in which the modification is reflected;
wherein:
the plurality of stored instantiation data structures includes a first instantiation data structure and a second instantiation data structure; and
the processor is configured to:
in response to a first application triggering event during execution of a computer program, the first application triggering event triggering a display of a first one of the user interface display screens:
obtain the first instantiation data structure, which includes a pointer to the first screen template that identifies a first plurality of user interface graphical objects;
process the first instantiation data structure, the processing of the first instantiation data structure including obtaining and instantiating the first screen template pointed to by the first instantiation data structure; and
output in a display device the instantiated first screen template for the creation of one of the plurality of different user interface display screens; and
in response to a second application triggering event during execution of the computer program, the second application triggering event triggering a display of a second one of the user interface display screens:
obtain the second instantiation data structure, which includes a pointer to a second screen template that points to the first screen template and that identifies or references a second plurality of user interface graphical objects;
process the second instantiation data structure, the processing of the second instantiation data structure including obtaining and instantiating the second screen template pointed to by the second instantiation data structure, the instantiation of the second screen template including instantiating the first screen template; and
output in the display device the instantiated second screen template for the creation of another one of the plurality of different user interface display screens.

31. The method of claim 30, further comprising:
displaying an editable version of one of the plurality of different user interface display screens in an editing interface, wherein the instruction is input by:
user selection of an object of the displayed editable version of the one of the plurality of different user interface display screens; and
input of property data for the selected object.

32. The method of claim 30, further comprising:
obtaining user-input of a second instruction to modify a second characteristic of the portion of the display screen;
responsive to the second instruction, modifying, by the processor, a modification script of one of the plurality of stored instantiation data structures that references the first screen template, which modification script is used for modifying an instantiation of the first screen template.

33. The method of claim 32, wherein the modification to the modification script corresponds to a change in a user interface object of the instantiation for the modification of which the modification script is used.

34. The method of claim 32, wherein the modification to the modification script corresponds to a change in data text of the instantiation for the modification of which the modification script is used.

* * * * *